United States Patent [19]

Johansson et al.

[11] Patent Number: 4,766,349

[45] Date of Patent: Aug. 23, 1988

[54] ARC ELECTRODE

[75] Inventors: Jan O. Johansson, Vinslöv; Jan-Erik Andersson, Lund; Tomasz Niklewski; Lars E. Edshammar, both of Stockholm, all of Sweden

[73] Assignee: AGA Aktiebolag, Lidingo, Sweden

[21] Appl. No.: 900,796

[22] Filed: Jun. 5, 1986

[30] Foreign Application Priority Data

Nov. 5, 1985 [SE] Sweden .................................. 8502765

[51] Int. Cl.⁴ .......................... H01J 17/04; B23K 9/26
[52] U.S. Cl. ..................................... 313/631; 313/627; 219/121.52
[58] Field of Search ............... 313/631, 632, 352, 627; 219/118, 119, 121 PR

[56] References Cited

U.S. PATENT DOCUMENTS

| | | | |
|---|---|---|---|
| 2,180,396 | 11/1939 | Burke | 219/119 |
| 3,198,932 | 8/1965 | Weatherly | 219/120 X |
| 3,546,422 | 12/1970 | Bykhovsky et al. | 219/121 P |
| 3,597,649 | 8/1971 | Bykhovsky et al. | 313/627 |
| 3,665,145 | 5/1972 | Engel | 219/119 |
| 3,930,139 | 12/1975 | Bykhovsky et al. | 219/121 PR X |

Primary Examiner—David K. Moore
Assistant Examiner—Sandra L. O'Shea
Attorney, Agent, or Firm—Pollock, Vande Sande & Priddy

[57] ABSTRACT

An electrode for electric arc processes composed of a water-cooled holder (1) into which is fitted a case hardened of diffusion coated insert of zirconium or hafnium. The diffusion zone (5) consists of carbide, nitride, boride or silicide, compounds with very high melting points that will supress reactions between the holder and the insert that cause deterioration of the electrode.

7 Claims, 1 Drawing Sheet

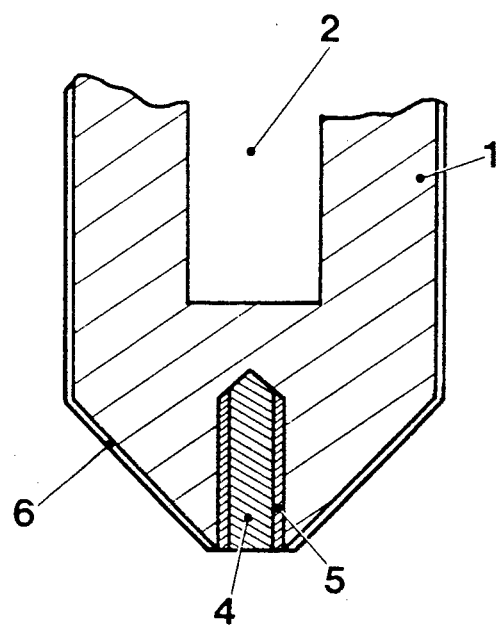

ARC ELECTRODE

This invention relates to an arc electrode composed of a holder of copper or of another metal with high thermal and electric conductivity and an insert fitted into the said holder. The electrode relates to devices working in active or inert media, preferably as a plasma-arc torch.

Plasma-arc torches are known to be used for different working of materials e.g., cutting of metals and non-metals, welding, chiseling, surface treatment, melting and annealing of metallic materials. Additional example is coating by plasma spraying.

The electrode may also be used in so called plasma reactors in which gases of extremely high temperatures are used in various plasma-chemical processes for example the reduction process for the manufacture of iron-sponge, cracking of higher hydrocarbons for acethylene production and destruction of pollution products.

Plasma electrodes under inert gas atmospheres generally utilize tungsten which is not consumed. However, in an active atmosphere of for example air, oxygen, carbonoxide or methane the tungsten electrode is rapidly deteriorated by oxidation. This disadvantage is known to be partially avoided by the introduction of electrode materials that are more stable in reactive media than tungsten is. For example materials such as zirconium and thorium have been described in the U.S. Pat. No. 3,198,932. This patent describes a water-cooled electrode holder with a high thermal conductivity for example copper into which is fitted a cathode insert of zirconium. The insert is metallurgically bonded to the water-cooled holder in order to increase the heat transfer from the insert to the holder.

The metallurgical bonding is described as follows:

The zirconium insert is cleaned by etching and immersed in molten zinc chloride. The insert zinc plated in this manner is then dipped in molten silver. Silver is also melted to form a liner in the cavety of the holder. The silver coated zirconium insert is brought into the cavity and then the insert and holder are soldered together by applying heat. A given example shows that a soldered zirconium cathode will operate in 2.5 hours but without a metallurgical bond only 17 minutes.

The U.S. Pat. No. 3,546,422 describes non-consumable electrodes for plasma-arc treatment in active media. In the electrodes, inert interlayers of the transition metals V, Nb, Cr and Mo are introduced between the zirconium insert and the copper holder.

Another arrangement has been described in the Swedish Pat. No. 7406977-4 where the non-consumable electrode consists of a hafnium based insert fitted into a water-cold copper holder. Between the insert and the holder is arranged an interlayer of aluminum or aluminum alloy the introduction of such an interlayer will give electrodes with longer operation times than found for electrodes without an interlayer. This circumstance has been explained by the formation of aluminum oxide (melting point 2043° C.) that acts like an heat shield and protects the copper holder from overheating and oxidation.

The Swedish Pat. No. 7903624-0 describes a water-cold copper holder with in insert of hafnium fitted into the holder. On the outer hafnium surface has been formed a surface layer of oxyhafnium carbide which is covered with a layer of graphite. The graphite is considered to suppress the heatflow into the insert and to give the electrode a higher heat stability and increased emission.

In the Swedish Pat. No. 7903624-0 as well as in the U.S. Pat. No. 3,198,932 is said that the zirconium insert reacts with the plasma generating gases forming surface layers of zirconium compounds. Thus in a carbon oxide atmosphere a layer of zirconium oxicarbide is formed. Such an electrode operates satisfactorily under 300 amperes and the oxycarbide is said to possess a better heat stability and gives higher emission than the zirconium metal itself. The thicknesses of the insert and the surface layers have not been given. Present investigations have shown that the electrode arrangements described above are unsatisfactory when the electrodes work in active media. Thus three different electrodes were prepared according to arrangements described above. The electrodes were tested in a plasma arc cutting device and with air as the arc gas. Periods of stable operation were compared and the electrodes were investigated by metallographical and phase-analytical methods. The results are summarized in the following examples.

1. An electrode with a hafnium insert fitted into a copper holder as described for U.S. Pat. No. 3,597,649 operated satisfactorily in only 20 minutes. The metallographical investigation showed that the hafnium insert had partially melted and also reacted with the copper of the holder.

The hafnium-copper phases that are formed have low melting points resulting in the formation of a drop at the tip of the cathode and the drop formation accelerates the deterioration of the electrode. A corresponding electrode with a zirconium insert was also tested and showed similar results except the time of satisfactory operation was even shorter. The melting points of zirconium and hafnium are 1860° C. and 2222° C. respectively. Among the phases found in the zirconium-copper phase diagram, $Zr_2Cu$ is the zirconium richest and has a melting point of 1000° C. whereas $Zr_2Cu_3$ is the phase with the lowest melting temperature at 895° C.

The melting points of the hafnium-copper system are not known but usually binary zirconium systems are very similar to the corresponding hafnium systems with the difference of a somewhat higher liquidus curve in the latter.

2. Electrodes with a hafnium insert fitted into a copper holder and with an interlayer of aluminum foil between the insert and holder according to the Swedish Pat. No. 7406977-4 gave stable arcs for 30 to 40 minutes. Corresponding cathodes with zirconium inserts with interlayers showed somewhat shorter periods of operation. Investigations of used electrodes showed that zirconium aluminides had been formed. Zirconium aluminides are formed at very exothermic reactions (high —$\Delta H$). The most stable phase in the Zr-Al phase diagram is $ZrAl_2$ with a melting point of 1647° C. and the lowest eutectic temperature of the diagram is 1352° C. at 89 weight percentage zirconium.

The Zr-Al and Hf-Al systems hold isomorphons phases and the temperatures mentioned for the Zr-Al system correspond to about 50° C. higher temperatures in the Hf-Al system. Alloying between the copper holder and the aluminum interlayer will not occur because the copper is walter-cooled and the heat of formations of the copper aluminides are rather low compared to those of the zirconium and hafnium aluminides. If an aluminum foil is used between the copper holder and the hafnium insert alloying will occur during operation and in a zone between the holder and insert there is a lowest liquidus point of about 1350° C. according to the Hf-Al system.

If the aluminum foil is eliminated an alloying zone will be formed with a lowest liquidus temperature of about 900° C. as found in the Hf-Cu system. The liquidus temperatures mentioned explain differences in time of operation for hafnium-copper electrodes with and without an aluminum foil interlayer. The present explanation has not been given in known patents.

3. Other known electrodes with interlayers comprising transition metals described in U.S. Pat. No. 3,546,422 also show alloying that effects the time of operation. Nor has this fact earlier been explained with analytical methods.

Thus an eutectic temperature of 1532° C. is found in the V-Zr system at 70,4 weight percentage zirconium. In the Cu-V system is found an eutectic temperature of 1532° C. at 83,6 weight percentage vanadium. In this case we will find an alloying zone between the holder and insert with melting temperatures in the range found above for electrodes containing interlayers of aluminum.

The object of the present invention is to eliminate problems and disadvantages indicated above. The present invention is mainly distinguished by the introduction of a high melting and to the holder inert surface zone on hafnium or zirconium inserts. The surface zone is built up by zirconium and hafnium compounds represented by carbides, nitrides, oxinitrides, carbonitrides, borides and silicides. In the present invention the surface zone is formed by case hardening or diffusion coating of zirconium and hafnium inserts in order to create a diffusion zone with melting points in the range of 2000° C.–4000° C.

The described inert high melting surface zone eliminates the need of the above mentioned interlayers between the insert and the holder of the electrode and the formation of alloys with melting points under 2000° C. are eliminated.

The case hardening or diffusion coating of the zirconium and hafnium inserts are performed by carburizing, nitriting, oxinitriding, nitrocarburizing, boriding or siliciding by gas processes, heating in carbonaceous and nitrogeneous salt baths, by pack cementation or fluidized bed technique.

In the present invention the holder with surface hardened insert is given a corrosion stable and heat reflecting finish of nickel, chromium, nickel-chromium or platinum metal applied by electroplating, PVD, CVD or electroless plating.

The FIGURE is a schematic of the electrode of the present invention.

The present invention is further illustrated in the following examples where electrodes are used for cutting of steel with air as an arc gas. The electrodes were of the type shown in the attached drawing. Referring to the drawing the electrodes consists of a copper holder 1 with an insert 4. The holder 1 is provided with a cooling chamber 2 through which water is circulated during operation. The insert 4 possesses according to the present invention a high melting inert diffusion zone 5. A thermal reflecting layer 3 on the holder is also indicated in the drawing.

EXAMPLE 1

Zirconium wires of 10 mm and the diameter of 1.7 mm were heat treated at 900° C. for 3 days. The heat treatment was carried out in sealed evacuated silica tubes filled with carbon powder. By this treatment the wires were case hardened to a depth of about 50 micrometers. The surface of the treated wire is extremely hard and consists of $\gamma$-ZrC which has a melting point of about 3400° C.

A 2 mm long insert of the case hardened (carborized) zirconium wire was fitted into a water waler cooled copper holder with a diameter of 3 mm. The electrode arranged in this manner was tested and operated satisfactorily for a period much longer than found for an electrode with a non-carborized insert.

EXAMPLE 2

An electrode arranged as in example 1 except with an insert of carborized hafnium was tested under similar conditions as in example 1. This electrode showed a longer period of operation than an electrode with an untreated hafnium insert. The carborized insert gave a stable arc for an operating period of 50 minutes. However, the copper holder started to erode and particles were transported with the gas passing around the cathode to the nozzle which was gradually clogged and finally stopped the operation.

EXAMPLE 3

An electrode was arranged and tested according to example 2 but with the difference of a 10 micrometer nickel finish on the copper holder with carborized insert. After one hour of operation the copper holder was intact and only a miner cavity was observed on the hafnium insert.

EXAMPLE 4

Hafnium wires of 1 mm diameter were heat treated during 4 hours at 1400° C. The heat treatment was carried out in nitrogen atmosphere at a pressure of 30 bar. The surface of the hafnium wire consisted of yellow hafnium nitride with the melting point of 3400° C. The hafnium nitride has a lower electrical resistivity than hafnium metal. A 2 mm thus nitrided hafnium insert was fitted into a water-cooled nickel coated copper holder. The electrode arranged in this manner was completely intact after one hour of operation.

The examples given above show that the described plasma electrodes with air passed around the cathode are made more durable if the hafnium and zirconium inserts are carborized and nitrided. The durability depends on the formation of extremely high melting and inert compounds introduced into the cylindric surface of the insert by diffusion. These compounds forming a diffusion zone prevent reactions to occur between the core of the insert and the holder.

The diffusion zone 5 in the drawing may be 10 to 100 micrometer thick and consist of HfC, HfN, HfON and HfCN which are compounds with the highest known melting points among all solids (3500°–4000° C.). Furthermore carborizing of hafnium will give a zone of low electrical resistivity and a high thermal conductivity between the core of the insert and the copper holder. The electrical resistivity for zirconium is $70 \cdot 10^{-8}$ ohm m where as the resistivity for zirconium carbide is $6,34 \cdot 10^{-8}$ ohm cm. The thermal conductivity is 17 W/mK for zirconium and 20,5 W/mK for zirconium carbide.

Case hardening and diffusion coating and commercial methods for surface treatment of steel and are performed by carborizing, nitriding, carbonitriding, boriding and siliciding. When carborizing, carbon is introduced into the surface of a work piece by heating in contact with solid or gaseous carbon or carbon compounds at temperatures between 500° C. and 1000° C. When nitriding, nitrogen is introduced into the surface by heating of the work piece in ammonia or other nitrogeneous material. Carbonitriding is performed by heating in salt bath and boriding and siliciding usually by pack cementation over a wide range of time and temperature depending on desired case depth and the base metal.

If for example a hafnium wire is borided the stable compound $HfB_2$ with a melting point of 3300° C. will be formed in the surface and zirconium silicide with a melting point of 2300° C. will be formed when siliciding zirconium. It has been shown that case hardening and diffusion coating of zirconium and hafnium inserts will prevent reactions between the insert and the holder of a plasma electrode.

However, the introduction of the diffusion coated inserts into the water-cooled copper holder must be accompanied with a protecting finish of nickel, chromium or platinum metal on the surface of the holder in order to prevent its deterioration during operation.

What is claimed is:

1. An electrode for plasma arc working in active or inert media comprising a holder of high thermal and electrical conductivity into which is fitted a diffusion coated or case hardened zirconium or hafnium insert to provide a diffusion zone of high temperature compounds between said holder and said insert.

2. An electrode according to claim 1 wherein said insert has been prepared by case hardening or diffusion coating of a zirconium or hafnium insert in order to introduce a diffusion zone of high temperature compounds between said holder and said insert into the surface with a melting temperature in the range of 2000°–4000° C.

3. An electrode according to claim 1 wherein said insert has been case hardened or diffusion coated by carborizing, nitriding, oxinitriding, carbonitriding, nitrocarborizing, boriding or siliciding by heating in gas, liquid salt bath or powder.

4. An electrode according to claim 2 wherein said insert has been case hardened or diffusion coated by carborizing, nitriding, oxinitriding, carbonitriding, nitrocarborizing, boriding, or siliciding by heating in gas, liquid salt bath, or powder.

5. The electrode of claim 1 wherein said insert provides a diffusion zone between said holder and insert of 10 to 100 micrometers thick.

6. The electrode of claim 1 wherein said insert provides a diffusion zone between said holder and insert of a material selected from the group of carbides, nitrides, oxynitrides, carbonnitrides, borides, and silicides of zirconium or hafnium.

7. The electrode of claim 1 wherein said holder is copper.

* * * * *